(12) United States Patent
Andras et al.

(10) Patent No.: US 6,457,914 B1
(45) Date of Patent: Oct. 1, 2002

(54) CLAMPING TOOL HOLDER

(75) Inventors: Linn R. Andras, Ligonier, PA (US); Lee E. Yothers, Latrobe, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 09/645,684

(22) Filed: Aug. 24, 2000

(51) Int. Cl.$^7$ .............................................. B23B 29/04
(52) U.S. Cl. ........................ 407/105; 407/104; 407/107
(58) Field of Search ................................ 407/105, 103, 407/104, 106, 107, 111, 112, 117

(56) References Cited

U.S. PATENT DOCUMENTS

| | | | |
|---|---|---|---|
| 1,396,180 A | 11/1921 | Fors | |
| 2,982,008 A | * 5/1961 | Facknitz | 407/112 |
| 2,999,301 A | 9/1961 | Conti et al. | |
| 3,102,326 A | 9/1963 | Conti et al. | |
| 3,138,846 A | 6/1964 | Conti et al. | |
| 3,243,864 A | 4/1966 | Yogus | |
| 3,314,126 A | 4/1967 | Stier | |
| 3,577,618 A | 5/1971 | Cashman | |
| 3,731,356 A | 5/1973 | Gowanlock | |
| 3,837,058 A | 9/1974 | Barkley et al. | |
| 4,035,890 A | 7/1977 | Eriksson et al. | |
| 4,244,666 A | 1/1981 | Erickson et al. | |
| 4,398,853 A | 8/1983 | Erickson | |
| 4,477,212 A | 10/1984 | Kraft | |
| 4,480,950 A | 11/1984 | Kraft et al. | |
| 4,600,341 A | 7/1986 | Board | |
| 4,697,963 A | 10/1987 | Lück | |
| 5,035,544 A | 7/1991 | Ikenaga et al. | |
| 5,100,268 A | 3/1992 | Nakayama et al. | |
| 5,536,120 A | 7/1996 | Miller | |
| 5,586,844 A | 12/1996 | Nyman | |
| 5,685,672 A | 11/1997 | Tjernström | |
| 5,820,311 A | 10/1998 | Grün et al. | |
| 5,944,457 A | 8/1999 | Tjernström | |

FOREIGN PATENT DOCUMENTS

| | | | |
|---|---|---|---|
| DE | 3709135 A1 | | 11/1987 |
| DE | 3709135 | | 11/1987 |
| DE | 4209084 | | 9/1993 |
| EP | 0402934 | | 6/1990 |
| EP | 0846516 | | 6/1998 |
| JP | 60-114403 | * | 6/1985 |
| JP | 60-114404 | * | 6/1985 |
| WO | PCT SE9500595 | | 7/1992 |
| WO | WO9532829 | | 12/1995 |

OTHER PUBLICATIONS

Sandvik Brochure –Rigid Clamping holders for T–Max P inserts for prolonged tool life and greater accuracy. pp. 11–13.

* cited by examiner

*Primary Examiner*—Henry Tsai
(74) *Attorney, Agent, or Firm*—Larry R. Meenan

(57) ABSTRACT

A clamping tool holder includes a tool holder body and a clamp for clamping a cutting insert. The clamp causes the cutting insert to press against the bottom and the side walls of an insert-receiving pocket of the tool holder body. The tool holder body has an inclined surface sloping inward in a direction away from the insert-receiving pocket. The clamp has a sliding face that acts as a ramp with the inclined surface of the tool holder body. A guide pin prevents the clamp from twisting during tightening or loosening of the clamp. When a clamp screw is tightened, the clamp only engages an inside rearward surface of the mounting hole and the rearward top surface of the cutting insert.

20 Claims, 6 Drawing Sheets

CLAMPING TOOL HOLDER

FIELD OF THE INVENTION

The present invention pertains to a clamping tool holder. More particularly, the present invention relates to a clamping tool holder for releasably securing an insert to the clamping tool holder.

BACKGROUND OF THE INVENTION

Typically, tool holder mechanisms utilize a conical bore whose axis is offset from the threaded section of the locking pin receiving hole to tilt the locking pin into abutment with the cutting insert. These designs are difficult to machine because the location of the conical bore must be maintained within a relatively tight tolerance if it is to achieve the desired tilting of the locking pin.

In addition, many tool holders utilize a resilient member, such as a spring, for urging the clamp in a forward direction as the clamp moves in a downward direction by the clamp screw. These designs need high precision and include unnecessary components, thereby resulting in increased manufacturing costs. Therefore, there is a need to provide a tool holder for clamping an insert that is simple to manufacture and has improved manufacturing tolerances while requiring fewer components.

SUMMARY OF THE INVENTION

An object of the invention is to provide a tool holder for releasably clamping an insert within a tool holder body.

In one aspect of the invention, a tool holder body includes an insert-receiving pocket formed at a forward end thereof and has a bottom and at least one side wall for receiving the insert. The bottom of the insert-receiving pocket has an internally threaded mounting bore. The tool holder includes an internally threaded clamp-securing bore formed between an inclined surface and the insert-receiving pocket. A clamp is arranged on the tool holder body. The clamp includes a lower face with a nose portion and a pair of pads. The clamp has a threaded aperture formed therethrough. A clamp screw is inserted into the threaded aperture of the clamp. The clamp screw has a threaded portion capable of being threaded onto the internally threaded clamp-securing bore of the tool holder body and the threaded aperture of the clamp to bring the clamp into pressing engagement with the insert. The nose portion of the clamp engages a rearward inside surface of the mounting bore of the insert and the pair of pads of the clamp engages a rearward top surface of the insert when the clamp is brought into pressing engagement with the insert.

In another aspect of the invention, the tool holder comprises a tool holder body includes an insert-receiving pocket formed at a forward end thereof and has a bottom and at least one side wall for receiving the insert. The bottom of the insert-receiving pocket has an internally threaded mounting bore. The tool holder includes an internally threaded clamp-securing bore formed between an inclined surface and the insert-receiving pocket. A clamp is arranged on the tool holder body. The clamp includes a lower face with a nose portion and a pair of pads. The clamp has a threaded aperture formed therethrough. A clamp screw is inserted into the threaded aperture of the clamp. The clamp screw has a threaded portion capable of being threaded onto the internally threaded clamp-securing bore of the tool holder body and the threaded aperture of the clamp to bring the clamp into pressing engagement with the insert. The clamp engages only the top surface of the insert and the hole of the insert when the clamp is brought into pressing engagement with the insert.

In yet another aspect of the invention, a tool holder for clamping an insert comprises a tool holder body including an insert-receiving pocket formed at a forward end thereof and having a bottom and at least one side wall. The bottom has an internally threaded mounting bore. The tool holder includes an internally threaded clamp-securing bore formed between an inclined surface and the insert-receiving pocket. The tool holder body further includes a pin-receiving bore formed in the tool body. A clamp is arranged on the tool holder body. The clamp includes a lower face with a nose portion and at least one pad. The clamp has a threaded aperture formed therethrough and a pin-receiving bore formed therein. A clamp screw is inserted into the aperture of the clamp. The clamp screw has a threaded portion capable of being threaded onto the internally threaded clamp-securing bore of the tool holder to bring the clamp into pressing engagement with the insert. A guide pin is capable of being received within the pin-receiving bore of the tool holder body and the pin-receiving bore of the clamp. The guide pin guides the clamp when the clamp is brought into pressing engagement with the insert.

In another aspect of the invention, a method of clamping an insert to a tool body, comprises the steps of:
 (a) providing a tool holder body including an insert-receiving pocket formed at a forward end thereof and having a bottom and at least one side wall, the bottom having an internally threaded mounting bore, the tool holder including an internally threaded clamp-securing bore formed between an inclined surface and the insert-receiving pocket, the insert-receiving pocket capable of receiving an insert having a mounting bore formed therethrough;
 (b) providing a clamp arranged on the tool holder body, the clamp including a lower face with a nose portion and a pair of pads, the clamp having a threaded aperture formed therethrough;
 (c) inserting a clamp screw into the aperture of the clamp, the clamp screw having a threaded portion capable of being threaded onto the internally threaded clamp-securing bore of the tool holder to bring the clamp into pressing engagement with the insert,
 whereby the nose portion of the clamp engages a rearward inside surface of a mounting bore of the insert and the pair of pads of the clamp engages a rearward top surface of the insert when the clamp is brought into pressing engagement with the insert.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
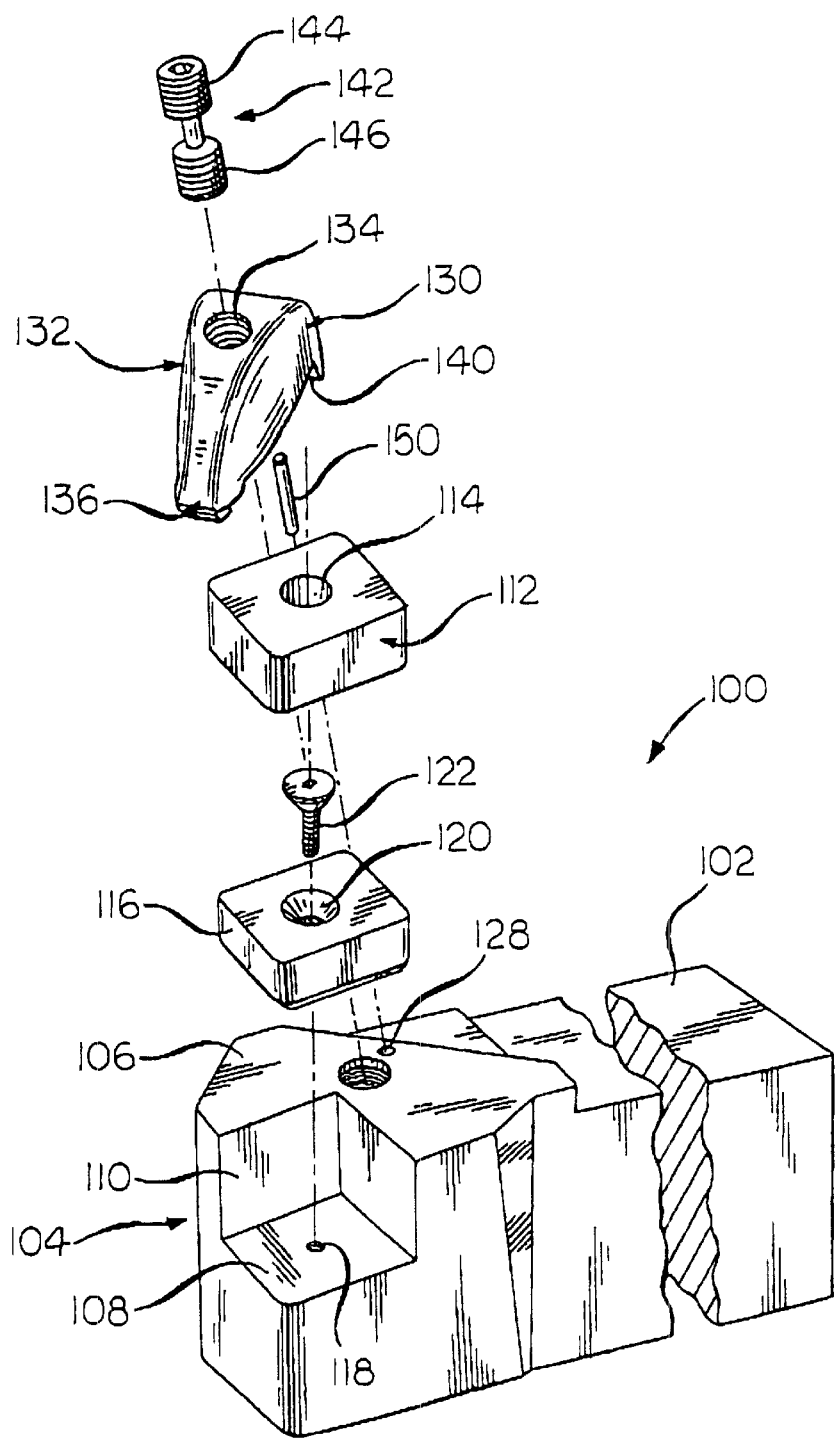
FIG. 1 is an exploded side perspective view of the clamping tool body in accordance with the invention.
Figure 2:
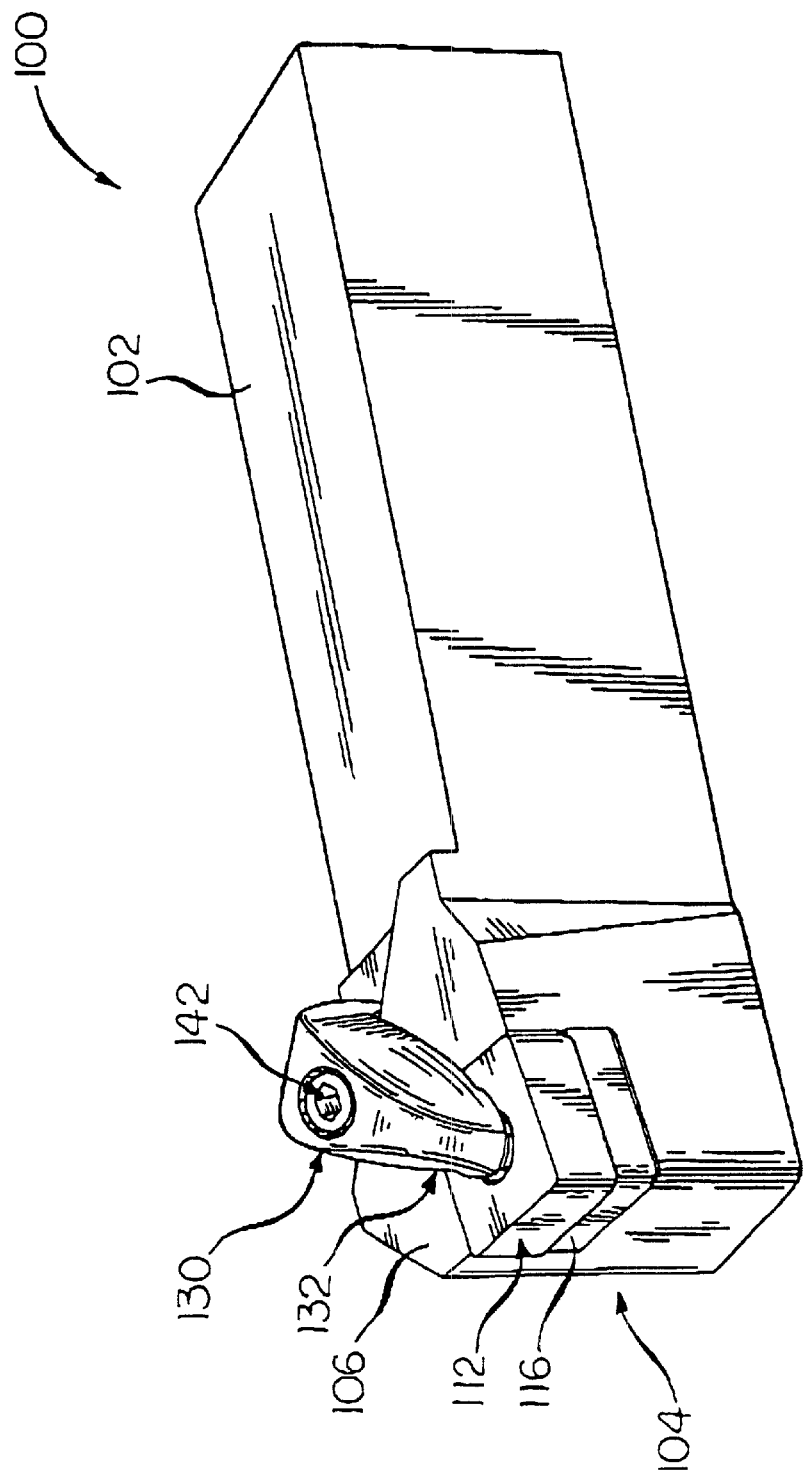
FIG. 2 is a side perspective view of the clamping tool body with the clamp engaging the insert in accordance with the invention.

One embodiment of the clamping tool holder 100 is shown in FIGS. 1–6. The clamping tool holder 100 comprises a tool holder body 102 having an insert-receiving pocket 104 formed in its upper surface 106 at a corner of its forward end portion. The insert receiving pocket 104 has a bottom 108 and angularly-disposed side walls 110. An insert 112 having a mounting bore 114 formed therethrough is disposed on the bottom 108 of the pocket 104 with a seat member 116 interposed therebetween. Although the insert 112 can be any shape, the illustrated insert 112 is generally square in shape having a top surface 112a. An internally threaded bore 118 is formed in the bottom 108 of the pocket 104, and a bore 120 having an upper portion tapering downward is formed through the seat member 116. The seat member 116 is fixedly secured to the insert-receiving pocket 104 by means of a countersunk screw 122 inserted through the bore 120 and screwed into the threaded bore 118.

In an alternative embodiment, the insert 112 can be disposed on the bottom 108 of the pocket 104 without the use of the seat member 116 and the head screw 122. In this alternative embodiment, it is not necessary to include the threaded bore 118 in the tool holder body 102.

Figure 3:
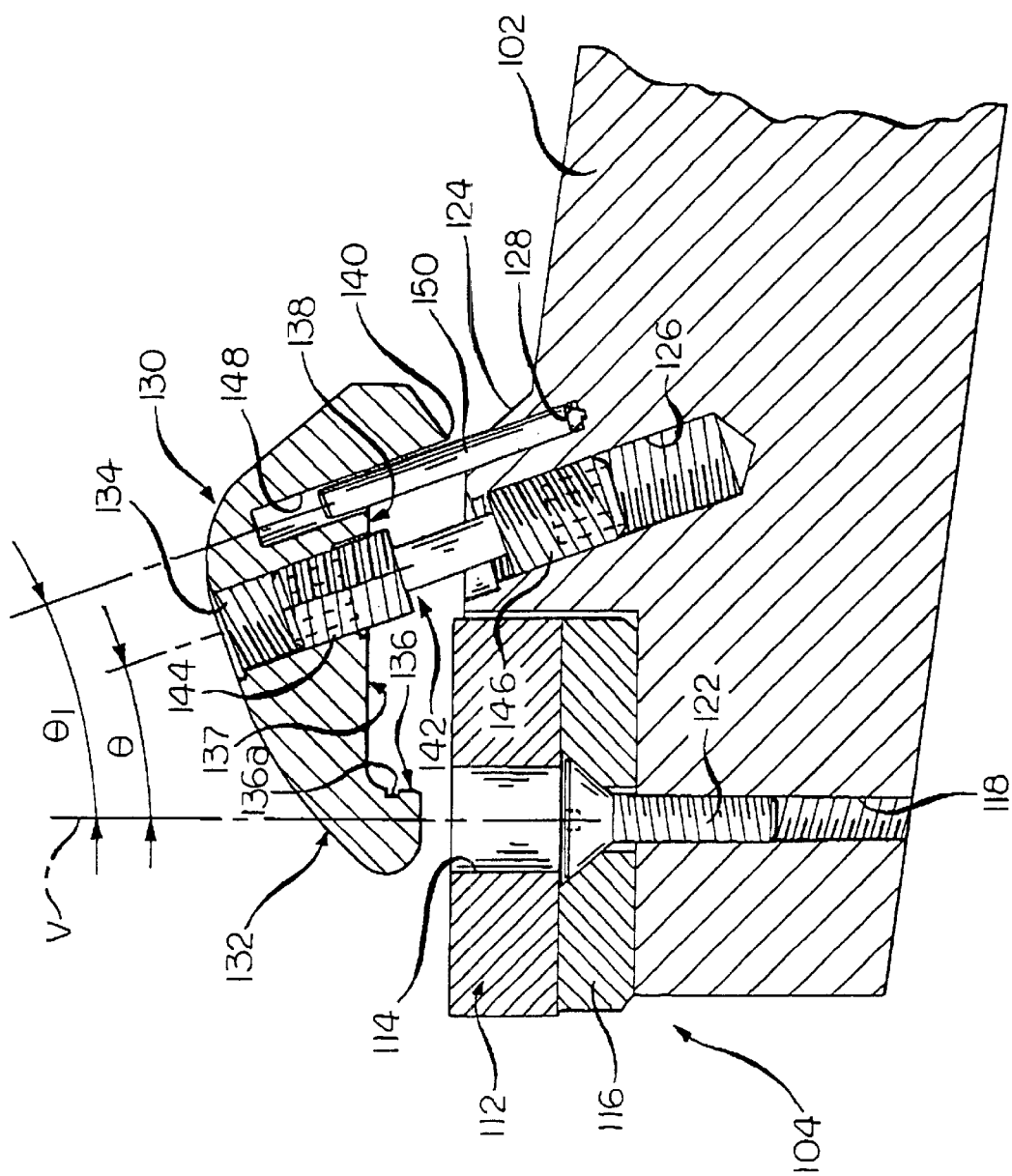
FIG. 3 is a partial cutaway cross-sectional view of the clamping tool body with the clamp not engaging the insert in accordance with the invention.

As best seen in FIG. 3, an inclined surface 124 sloping inwardly in a direction away from the insert-receiving pocket 104 is formed on that portion of the upper surface 106 of the tool body which is displaced rearwardly of the tool body with respect to the pocket 104. The inclined surface 124 is preferably at a prescribed angle with respect to the axis of the bore 118. An internally threaded clamp-securing bore 126 is formed in the tool holder 100 and is located between the inclined surface 124 and the insert-receiving pocket 104. The clamp-securing bore 126 is preferably at a prescribed acute inclination angle, θ, with respect to the axis of the bore 118.

Figure 4:
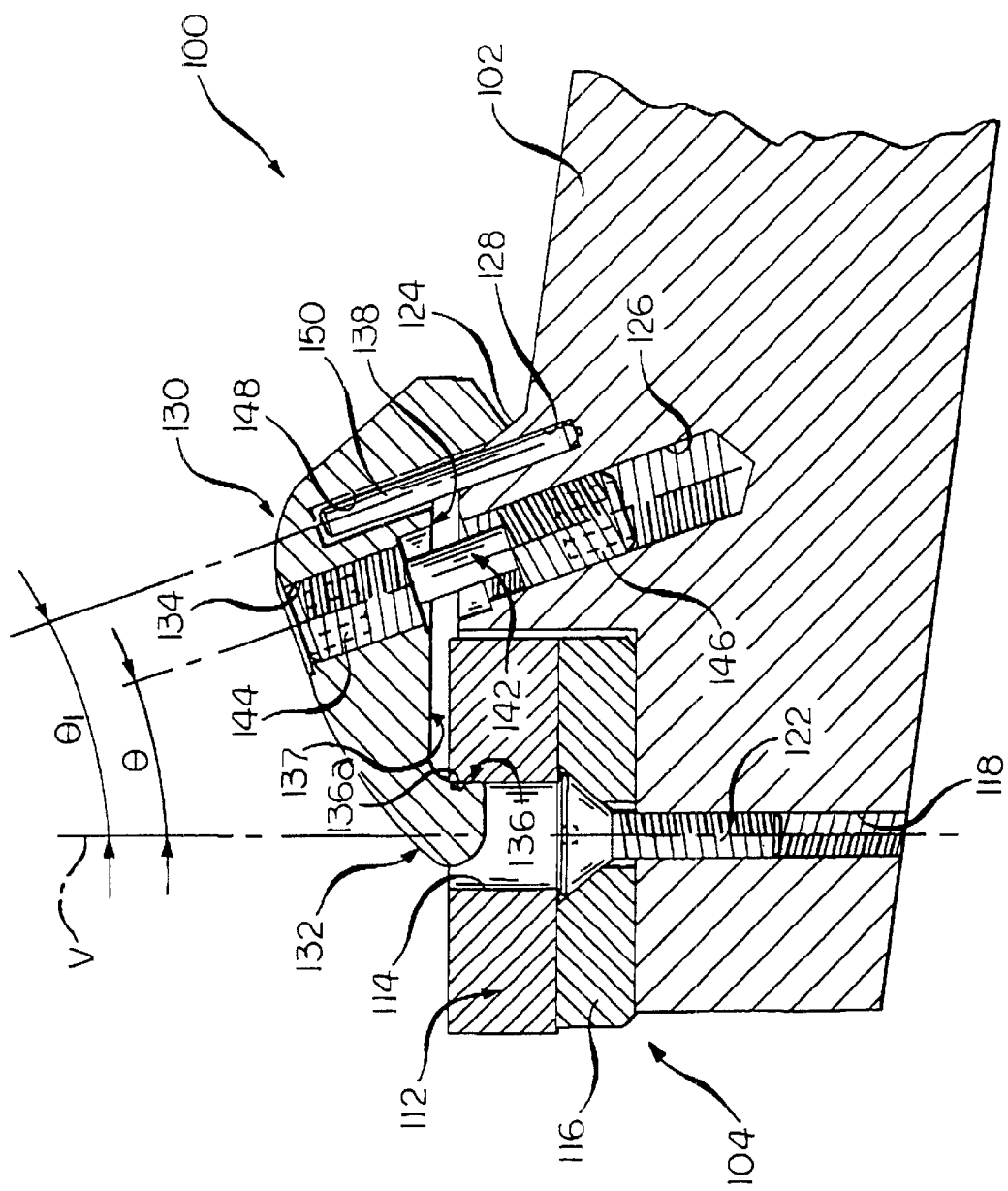
FIG. 4 is a partial cutaway cross-sectional view of the clamping tool body with the clamp engaging the insert in accordance with the invention.
Figure 7:
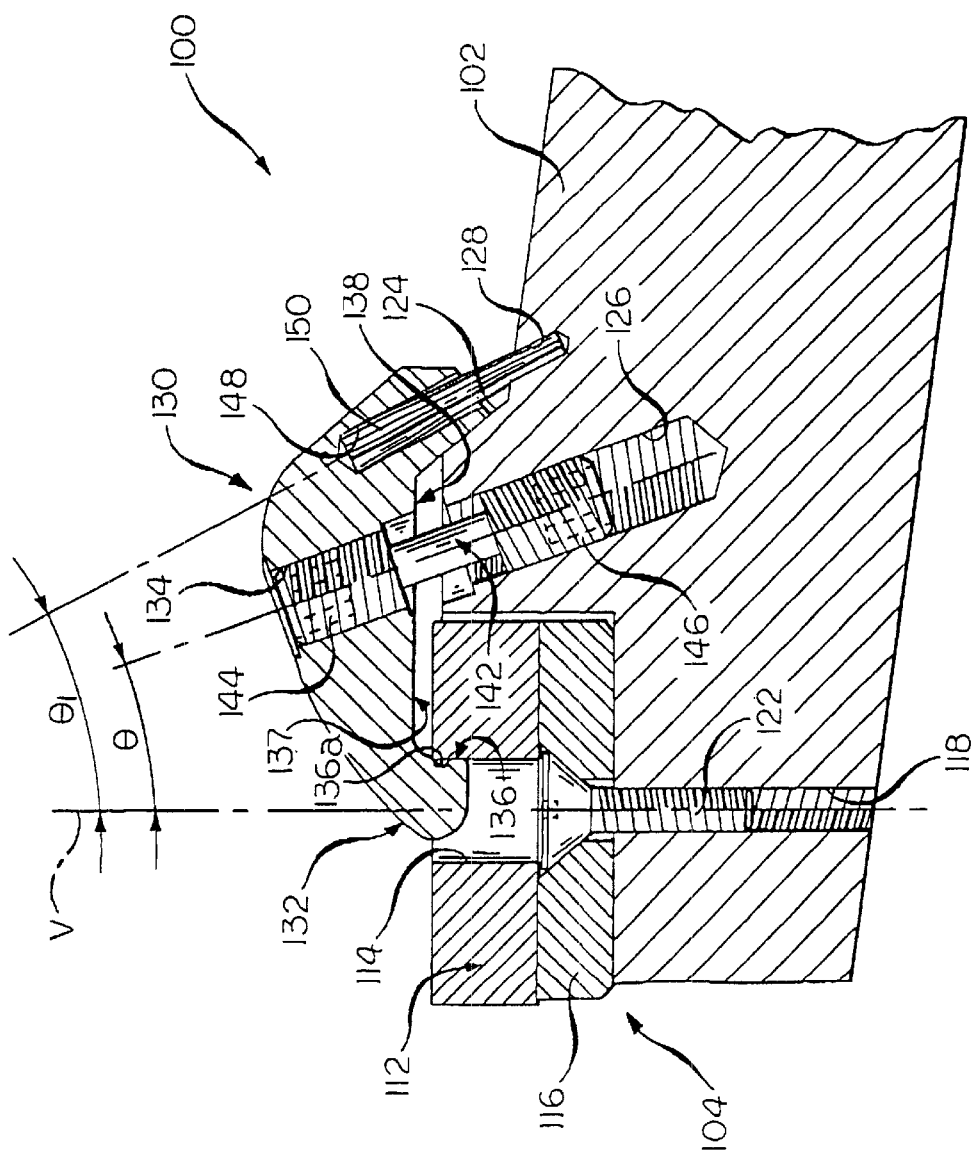
FIG. 7 is a partial cutaway cross-sectional view of the clamping tool body with the clamp engaging the insert in accordance with another embodiment of the invention.

The tool holder 100 further includes a pin-receiving bore 128 formed in the tool holder 100. The pin-receiving bore maintains alignment of the clamp and the tool body as the clamp 130 presses downward and rearward on the insert 112. As best seen in FIGS. 3 and 4, the pin-receiving bore 128 is located between the inclined surface 124 and the clamp-securing bore 126. Alternatively, the inclined surface 124 can be located between the pin-receiving bore 128 and the clamp-securing bore 126, as shown in FIG. 7. Preferably, the pin-receiving bore 126 has an inclination angle, $\theta_1$, with respect to the axis of the bore 114 that is approximately the same as the inclination angle, θ, defined between the clamp-securing bore 126 and the axis of the bore 118. In other words, the pin-receiving bore 128 and the clamp-securing bore 126 are substantially parallel to each other. It should be noted that the angle of the inclined surface 124 with respect to the bore 118 may be the approximately the same or may be different than the prescribed angle of the clamp-securing bore 126 with respect to the bore 118.

A clamp 130 is arranged on the upper surface 106 of the tool holder body 102. As best shown in FIG. 3, the clamp 130 is of a generally C-shape in side elevation having a tapered forward portion 132 and tapered side portions 132a, 132b to provide a low profile design. The low profile design facilitates the removal of chips during the cutting process. Formed in the center of the clamp 130 is an aperture 134 which has approximately the same diameter as the clamp-securing bore 126 of the tool holder 100. As best shown in FIG. 1, the aperture 134 is formed so that its axis is concentric with the axis of the clamp-securing bore 126.

Figure 5:
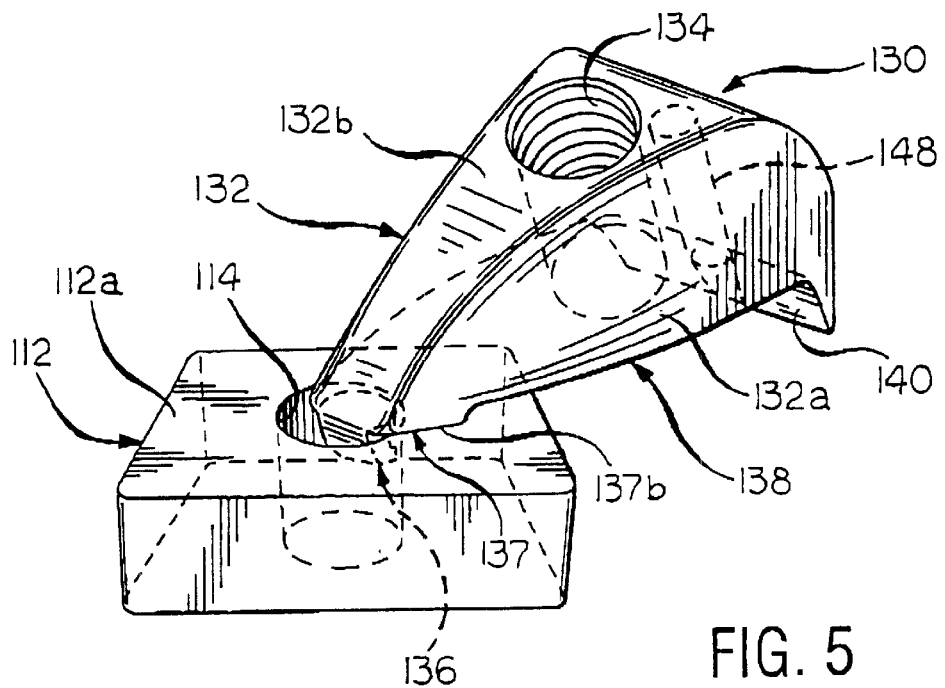
FIG. 5 is a side perspective view of the clamp engaging the insert.

As best seen in FIG. 3, the lower face of the forward portion 132 of the clamp 130 includes an arcuately-shaped nose portion 136 to be held in engagement with the inside surface of the mounting bore 114 of the insert 112. The nose portion 136 also includes an indentation or notch portion 136a to facilitate in the engagement of the nose portion 136 and the mounting bore 114 of the insert 112. The clamp 130 includes a forward lower face 137 and a rearward lower face 138. The forward lower face 137 includes one or more pair of pads 137a, 137b for engaging the top surface 112a of the insert 112. The pads 137a, 137b assist in distributing the downward and rearward force of the clamp 130 over the top surface 112a of the insert 112. It will be appreciated that the invention is not limited by the number of pads 137a, 137b. For example, the lower face 137 may include a third pad to form a tripod-shaped pad arrangement. In addition, the pads 137a, 137b may be eliminated. The rearward lower face 138 is formed so as to be positioned higher than the forward lower face 137 so as to not engage the insert 112 when the pads 137a, 137b are engaging the top surface 112a of the insert 112, as best shown in FIGS. 4 and 5.

The clamp 130 has an inclined surface 140 formed at a proximal end thereof so as to protrude downward and rearward with respect to the bore 118. Preferably, the inclined surface 140 is at approximately the same angle as the angle of the inclined surface 124 of the holder 102 to enable the inclined surfaces 124, 140 to act as a ramp to enable the clamp 130 to more easily slide downward and rearward when the clamp 130 is brought into pressing engagement with the insert 112. The inclined surfaces 124, 140 acting as a ramp provide a crucial "pull back" feature of the invention.

It should be noted that the relative angle between the clamp-securing bore 126 and the inclined surfaces 124, 140 can be "tuned" to provide a desired downward force and/or rearward force on the insert 112. Preferably, the angle of the clamp-securing bore 126 of the inclined surfaces 124, 140 are approximately 40 degrees with respect to a vertical axis, V, to provide slightly more downward force than rearward force on the insert 112. However, it will be appreciated that the relative angle between the clamp-securing bore 126 and the inclined surfaces 124, 140 be the same angle or may differ by any desired amount. For example, the inclined surfaces 124, 140 may have an angle of 0 degrees and the clamp-receiving bore 126 may have an angle of 40 degrees or more with respect to the vertical axis, V.

The clamp 130 is secured to the tool holder body 102 by means of a double-ended clamp screw 142 having opposite threaded portions 144, 146 which is inserted through the aperture 134 and screwed into the threaded clamp-securing bore 126 and the aperture 134 of the clamp 130. The threaded portion 144 and the aperture 134 are threaded in a direction opposite to the threaded portion 146 and the clamp securing bore 126 of the tool holder body 102. For example, the bore 126 of the tool holder body 102 may have right hand threads and the aperture 134 of the clamp 130 may have left hand threads. The acute inclination angle, θ, of the clamp-securing bore 126 and the bore 126 allows the clamp 130 to move downward and rearward as the clamp screw 142 is tightened. The use of a double-threaded clamp screw 142 allows the indexing of the clamp 130 to be twice as fast as conventional tool holders using spring mechanisms and the like, thereby reducing downtime and increasing production time. It will be appreciated that the threads of the aperture 134 and the bore 126 may be slightly larger than the threads of the clamp screw 142 to allow for variations in design, i.e. manufacturing tolerances in the tool holder 100.

The lower face 138 of the clamp 130 also includes a pin-receiving bore 148 positioned between the inclined surface 140 and the aperture 134. As best shown in FIGS. 3, 4 and 7, the pin-receiving bore 148 of the clamp 130 is formed so that its axis is substantially concentric with the axis of the pin-receiving bore 128 of the tool holder body 102. A guide pin 150 is disposed within the pin-receiving bores 128, 148 to prevent the clamp 130 from spinning or twisting in an axial direction (in a direction perpendicular to the direction of travel of the clamp screw 142) when turning of the clamp screw 142 to loosen or tighten the clamp 130. Although the guide pin 150 can be formed of a solid pin, the guide pin 150 is preferably formed of a slotted spring pin that can flex, expand or compress to allow for variations in design and wear of the tool holder 100. Specifically, the slotted spring pin 150 can flex to maintain the relative positions of the aperture 134, the bore 126, the pin-receiving bore 128 and the pin-receiving bore 148 to compensate for changes in the inclination angle, 1, that may result due to manufacturing tolerances and wear of the tool body 102, the mounting bore 114, and the clamp 130 (i.e., alignment creep). The guide pin 150 can be press fit into the pin-receiving bore 128 of the tool holder body 102. The length of the guide pin 150 is selected to allow the clamp 130 to move away from the insert 112 while preventing the clamp 130 from spinning or twisting in the axial direction.

Preferably, the diameter of the pin-receiving bore 148 can be slightly larger than the diameter of the guide pin 150 to allow free movement of the guide pin 150 within the pin-receiving bore 148. In addition, the diameter of the pin-receiving bore 128 can be slightly larger than the diameter of the guide pin 150. It will be appreciated that the pin-receiving bore 148 and guide pin 150 can be eliminated by forming the inclined surfaces 124, 140 with convex, concave or contour complementary shaped surfaces. Oppositely, the inclined surfaces 124, 140 can be eliminated and made integral with the guide pin 150 or attached as a separate component when retrofitting a conventional tool holder.

With reference to FIGS. 3 and 4, the clamping operation of the tool holder 100 using the clamp 130 will now be described. Usually, since the clamping operation is required only when replacing the cutting insert with a new one, it is not necessary to move the clamp 130 upward from the position shown in FIG. 3. Therefore, there may be provided a stop member (not shown) to prevent the clamp screw 140 from being further loosened from the state shown in FIG. 3.

From the state shown in FIG. 3 where the clamp screw 142 is loosened, the clamp screw 142 is first screwed into the clamp-securing hole 126 to cause the clamp 130 to move downward and rearward with respect to the insert 112. The clamp 130 is guided by guide pin 150 as it moves downward and rearward along the axis of the pin-receiving bore 128 of the tool holder body 102.

As the clamp 130 is further tightened by turning the clamp screw 142, the forward portion 132 of the clamp 130 is caused to positively move into the mounting bore 114 of the insert 112 without abutting against the upper face of the insert 112. Then, the nose portion 136 presses the insert 112 toward the bottom 108 and the side walls 110 of the pocket 104. As the clamp is further tightened, the pads 137a, 137b press against the top surface 112a of the insert 112. In addition, the inclined surfaces 124, 140 act as a ramp to cause the clamp 130 to press the insert 112 downward and rearward to further secure the insert 112 to the pocket 104.

Figure 6:
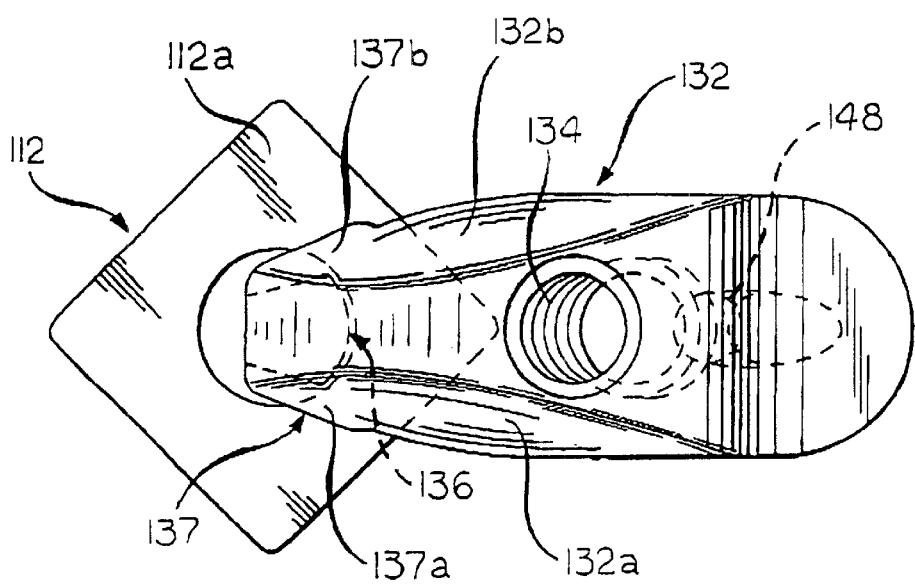
FIG. 6 is a top view of the clamp engaging the insert.

One important aspect of the invention is that the clamp 130 only contacts the inner surface of the mounting bore 114 and the top surface 112a of the insert 112 when the clamp 130 is brought into pressing engagement with the insert 112. Specifically, the nose portion 136 of the clamp 130 engages only the rearward inner surface of the mounting bore 114, as best shown in FIGS. 4 and 5. Once the nose portion 136 engages the inner surface of the mounting bore 114, the pads 137a, 137b engage only the rearward portion of the top surface 112a of the insert 112, as best shown in FIG. 6.

Another important aspect of the invention is that the lower face 138 of the clamp 130 does not engage the insert 112 when the clamp 130 is brought into pressing engagement with the insert 112 because the lower face 138 is formed at a higher elevation than the nose portion 136, as best shown in FIG. 4.

It will be appreciated that the invention is not limited by the type and shape of the insert 112, and that the invention can be practiced with any desirable shape and type of insert. For example, when the insert 112 is of a triangular in shape, rather than square or rectangular, the receiving pocket 104 can also be triangular in shape to accommodate the shape of the insert 112.

When removing the insert 112 from the tool holder body 102, the clamp screw 142 is turned to cause the clamp 130 to move obliquely along the inclined surface 106 while being urged upwardly so that the pressing force of the nose portion 136 of the clamp 112 against the insert 112 is released. As the clamp 130 is further loosened, the sliding face 140 is separated from the inclined surface 124, as shown in FIG. 3. In this released condition, the nose portion 136 of the clamp 130 is positioned above the insert 112 such that the insert 112 can be easily removed and replaced by a new insert 112. Accordingly, the clamp 130 is released such that replacing operation for the insert 112 can be conducted efficiently.

As described above, the clamp 130 is caused to move downward and rearward by means of the double-ended clamp screw 140 to engage only the inside surface of the mounting bore 114 and the rearward top surface 112a of the insert 112. This action brings the insert 112 into pressing engagement with the bottom 108 and the side faces 110 of the pull back clamping tool holder 100 to exert a uniform clamping force on the insert 112. To prevent the clamp 130 from twisting when tightening or loosening the clamp 130, the clamp screw 140 and guide pin 150 keep the clamp 130 and the tool holder body 102 in proper alignment with each other.

The patents and publications referred to herein are hereby incorporated by reference.

Having described presently preferred embodiments the invention may be otherwise embodied within the scope of the appended claims.

What is claimed is:

1. A tool holder for releasably securing an insert having a mounting bore formed therethrough, comprising:

(a) a tool holder body including an insert-receiving pocket formed at a forward end thereof and having a bottom and at least one side wall for receiving the insert, the bottom of the insert-receiving pocket having an internally threaded mounting bore, the tool holder including an internally threaded clamp-securing bore formed between an inclined surface and the insert-receiving pocket;

(b) a clamp arranged on the tool holder body, the clamp including a lower face with a nose portion and at least one pad, the clamp having a threaded aperture formed therethrough; and (c) a clamp screw inserted into the threaded aperture of the clamp, the clamp screw having a threaded portion capable of being threaded onto the internally threaded clamp-securing bore of the tool holder body and the threaded aperture of the clamp to bring the clamp into pressing engagement with the insert, wherein the nose portion of the clamp only engages a rearward inside surface of the mounting bore of the insert and each at least one pad of the clamp only engages a top surface of the insert rearward of the mounting bore when the clamp is brought into pressing engagement with the insert.

2. The tool holder according to claim 1, wherein the tool holder includes an inclined surface having a prescribed angle with respect to the mounting bore of the tool holder, and wherein the clamp further includes an inclined surface formed at a proximal end having approximately the same prescribed angle as the inclined surface of the tool holder.

3. The tool holder according to claim 2, wherein the angle between the inclined surface of the tool holder and the inclined surface of the clamp is different than the angle between the mounting bore and the clamp-securing bore of the tool holder.

4. The tool holder according to claim 1, wherein the tool holder also includes a pin-receiving bore formed therein, and wherein the clamp also includes a pin-receiving bore formed therein.

5. The tool holder according to claim 4, further including a guide pin capable of being received within the pin-receiving bore of the tool holder and the pin-receiving bore of the clamp.

6. The tool holder according to claim 4, wherein the pin-receiving bore of the tool holder and the pin-receiving bore of the clamp are formed at an angle approximately equal to an angle formed between the mounting bore and the clamp-securing bore of the tool holder.

7. The tool holder according to claim 1, wherein the clamp screw is a double-ended clamp screw having a first threaded portion and a second threaded portion being threaded in a direction opposite than the first threaded portion, the first threaded portion capable of being threaded onto the clamp screw, the second threaded portion capable of being threaded onto the internally-threaded clamp-securing bore.

8. A clamping tool holder for releasably securing an insert having a top surface and a hole therethrough, the tool holder comprising:

(a) a tool holder body having an insert-receiving pocket formed at a forward end thereof and an inclined surface rearward of the insert-receiving pocket, the tool holder body including an internally threaded clamp-securing bore formed between the inclined surface and the insert-receiving pocket;

(b) a clamp arranged on the tool holder body, the clamp including a lower face with a nose portion and at least one pad, the clamp having a threaded aperture formed therethrough; and (c) a clamp screw inserted into threaded aperture of the clamp, the clamp screw having a threaded portion capable of being threaded onto the internally threaded clamp-securing bore of the tool holder body and the threaded aperture of the clamp to bring the clamp into pressing engagement with the insert, wherein the clamp engages only the top surface of the insert rearward of the hole and the readward inner surface of the hole when the clamp is brought into pressing engagement with the insert.

9. The tool holder according to claim 8, wherein the tool holder includes an inclined surface having a prescribed angle with respect to the mounting bore of the tool holder, and wherein the clamp further includes an inclined surface formed at a proximal end having approximately the same prescribed angle as the inclined surface of the tool holder.

10. The tool holder according to claim 9, wherein the angle between the inclined surface of the tool holder and the inclined surface of the clamp is different than the angle between the mounting bore and the clamp-securing bore of the tool holder.

11. The tool holder according to claim 8, wherein the tool holder also includes a pin-receiving bore formed therein, and wherein the clamp also includes a pin-receiving bore formed therein.

12. The tool holder according to claim 11, further including a guide pin capable of being received within the pin-receiving bore of the tool holder and the pin-receiving bore of the clamp.

13. The tool holder according to claim 12, wherein the pin-receiving bore of the tool holder and the pin-receiving bore of the clamp are formed at an angle approximately equal to an angle formed between the mounting bore and the clamp-securing bore of the tool holder.

14. The tool holder according to claim 8, wherein the clamp screw is a double-ended clamp screw having a first threaded portion and a second threaded portion being threaded in a direction opposite than the first threaded portion, the first threaded portion capable of being threaded onto the clamp screw, the second threaded portion capable of being threaded onto the internally-threaded clamp-securing bore.

15. A tool holder for clamping an insert, comprising:

(a) a tool holder body including an insert-receiving pocket formed at a forward end thereof and having a bottom and at least one side wall, the bottom having an internally threaded mounting bore, the tool holder body including an internally threaded clamp-securing bore formed between an inclined surface and the insert-receiving pocket, the tool holder body further including a pin-receiving bore formed in the tool holder body;

(b) a clamp arranged on the tool holder body, the clamp including a lower face with a nose portion and at least one pad, the clamp having a threaded aperture formed therethrough and a pin-receiving bore formed therein;

(c) a clamp screw inserted into the threaded aperture of the clamp, the clamp screw having a threaded portion capable of being threaded onto the internally threaded clamp-securing bore of the tool holder to bring the clamp into pressing engagement with the insert;

(d) a guide pin capable of being received within the pin-receiving bore of the tool holder body and the pin-receiving bore of the clamp, wherein the guide pin guides the clamp when the clamp is brought into pressing engagement with the insert.

16. The tool holder according to claim 15, wherein the pin-receiving bore of the tool holder and the pin-receiving bore of the clamp are formed at an angle approximately equal to an angle formed between the mounting bore and the clamp-securing bore of the tool holder.

17. The tool holder according to claim 15, wherein the tool holder includes an inclined surface having a prescribed angle with respect to the mounting bore of the tool holder, and wherein the clamp further includes an inclined surface formed at a proximal end having approximately the same prescribed angle as the inclined surface of the tool holder.

18. The tool holder according to claim 17, wherein the angle between the inclined surface of the tool holder and the inclined surface of the clamp is different than the angle between the mounting bore and the clamp-securing bore of the tool holder.

19. The tool holder according to claim 15, wherein the clamp screw is a double-ended clamp screw having a first threaded portion and a second threaded portion being threaded in a direction opposite than the first threaded portion, the first threaded portion capable of being threaded onto the clamp screw, the second threaded portion capable of being threaded onto the internally-threaded clamp-securing bore.

20. A method of clamping an insert to a tool body, comprising the steps of:
   (a) providing a tool holder body including an insert-receiving pocket formed at a forward end thereof and having a bottom and at least one side wall, the bottom having an internally threaded mounting bore, the tool holder including an internally threaded clamp-securing bore formed between an inclined surface and the insert-receiving pocket, the insert-receiving pocket capable of receiving an insert having a mounting bore formed therethrough;
   (b) providing a clamp arranged on the tool holder body, the clamp including a lower face with a nose portion and a pair of pads, the clamp having a threaded aperture formed therethrough;
   (c) inserting a clamp screw into the aperture of the clamp, the clamp screw having a threaded portion capable of being threaded onto the internally threaded clamp-securing bore of the tool holder to bring the clamp into pressing engagement with the insert
   whereby the nose portion of the clamp engages only a rearward inside surface of a mounting bore of the insert and the pair of pads of the clamp engages only a top surface of the insert rearward of the mounting bore when the clamp is brought into pressing engagement with the insert.

* * * * *